United States Patent [19]
Morris et al.

[11] 4,358,233
[45] Nov. 9, 1982

[54] COLLAPSIBLE BULKHEAD

[75] Inventors: Richard D. Morris, Liverpool; L. Thomas Lane, Manlius, both of N.Y.

[73] Assignee: Carrier Corporation, Syracuse, N.Y.

[21] Appl. No.: 174,336

[22] Filed: Aug. 1, 1980

[51] Int. Cl.³ .......................... B60P 7/14; B61D 45/00
[52] U.S. Cl. .................................. 410/127; 296/24 C; 220/1.5
[58] Field of Search .............. 296/24 B, 24 C; 62/63; 410/127, 135, 128, 140, 141, 143, 153; 160/368 R; 220/1.5

[56] References Cited

U.S. PATENT DOCUMENTS

| | | | |
|---|---|---|---|
| 3,200,772 | 8/1965 | Moorehead | 410/127 |
| 3,212,458 | 10/1965 | Robertson | 410/127 |
| 3,472,180 | 10/1969 | Loomis | 410/127 |
| 3,559,591 | 2/1971 | Breev | 410/127 |
| 3,590,746 | 7/1971 | Gibson | 410/127 |

Primary Examiner—Richard A. Bertsch
Attorney, Agent, or Firm—J. Raymond Curtin

[57] ABSTRACT

A bulkhead formed of nesting channels connected together with toggle arms. The channels are attached to the forward wall of a refrigerated trailer and form a barrier to protect a refrigeration unit and provide an unrestricted air passage duct for return air. A channel shaped outboard extending support member swivels on toggle arms and due to its overcenter arrangement, remains extended vertically. When the outboard member is rotated upwardly, the channels and toggles nest together decreasing the depth of the apparatus. The collapsed position is maintained by several spring retaining clips that grasp a toggle arm connecting member.

In another embodiment the channels are connected together with a solid partition which is positioned above the floor and below the air discharge opening of a refrigeration unit.

5 Claims, 11 Drawing Figures

COLLAPSIBLE BULKHEAD

BACKGROUND OF THE INVENTION

1. Field of the Invention

The present invention relates to bulkheads for vehicle bodies containing refrigeration systems in general. More specifically to refrigeration unit protecting and air flow duct bulkheads that collapse to reduce the overall depth.

2. Description of Prior Art

Previously, bulkheads have been used in conjunction with refrigerated trucks and trailers. Although these bulkheads are of similar construction, there are two basic uses. The first is to isolate the interior into compartments to provide different environmental conditions of temperature and humidity or to reduce the volume being refrigerated. The second purpose of a bulkhead is to protect a mechanical vapor cycle refrigeration unit from physical damage during loading and load shifting while operating over the road. Further, the bulkhead provides an air passageway for the cooled air to enter the return side of the evaporator coil when a load is touching the interior front wall. This invention is related to the latter utility with prior art limited to fixed bulkheads constructed integral with the trailer wall. These are usually fabricated of a wood or metal structure attached vertically and plywood or composition material affixed to the exposed surface forming a protective shield with vertical openings in between. The plywood is located a distance up from the floor, providing an opening for the return air. Other art utilizes a series of rails usually of structural metal located strategically on the front wall to accomplish the same purpose, except the plywood is omitted.

Learmont in U.S. Pat. No. 3,057,284 teaches a movable bulkhead for the former purpose hinging from the top to compartmentize the trailer with a propeller fan moving air from one compartment to the other. The bulkhead also moves forward and aft on rollers with tracks embedded longitudinally into the trailer walls. The apparatus also hinges from the top and swings upward to the ceiling for storage. This top hinging may become dangerous when worn or improperly latched and the thickness of the bulkhead remains the same regardless of its position. U.S. Pat. No. 2,633,714 issued to Wehby discloses interior doors that open at the center and swing planar to the walls, however, the volume of the door is not reduced but is only relocated to the interior sides of the trailer.

Other patents which lend themselves to refrigerated trailer bulkheads and may be considered material in the sense of prior art with respect to this application are U.S. Pat. Nos. 1,704,758 of Meinhardt, and 2,895,309 issued to Kuhlmeier. However, neither of these are considered to have teachings which disclose or suggest the overall arrangement of this invention.

SUMMARY OF THE INVENTION

With the advent of the energy shortage, enlarging the interior cubic foot area of trailers and truck bodies has become increasingly important. As government regulations have limited the overall size of over-the-road equipment, the efficiency of the loading and interior length has been carefully studied. Refrigerated trailers are often used for dry back hauls or returning from their destination with a load of non-refrigerated freight. The available interior length, especially with items that will "cube out" or fill the interior completely before it "grosses out" in maximum allowable gross vehicle weight, becomes a major consideration.

The refrigeration industry has reacted to this problem by developing nosemounted mechanical refrigeration units that protrude into the trailer interior only a fraction of the distance, heretofore considered acceptable. Even further, units that are completely flush with the front wall are now marketed.

Another factor is the increasing use of palletized loads. The pallet is loaded outside of the trailer, the approximate height and unitary width of the interior, creating a problem if the front end of the trailer is unduly restricted. A few additional inches in interior trailer length may permit the loading of an additional pallet.

It is, therefore, the primary object of this invention to overcome this problem by providing a collapsible bulkhead. The bulkhead not only protects the evaporator from physical damage and allows optimum return air flow, but collapses against the wall providing additional loading space.

An important object reduces the air flow to the evaporator only approximately 25% when the bulkhead is collapsed. This is sufficient volume to operate a refrigeration unit without adverse effect if the bulkhead is inadvertently left collapsed.

Another object provides the use of the invention with not only flush or minimum evaporator penetration units, but also full evaporator extending refrigeration systems. The bulkhead may be installed below the evaporator with cargo loaded underneath utilizing effectively the collapsible advantage.

Still another feature allows the use of independent vertical members for palletized cargo in closed containers where the air flow cannot be blocked due to the solid load configuration. Collapsing may be accomplished singally by individual manual operation. An optional feature allows the members to be attached together with a solid partition creating an air flow duct and offering protection to the refrigeration unit when smaller objects are loaded or when stacking individual containers at the front wall.

Openings in the extending support members line-up with similar holes in the base to allow a tool to be inserted for attaching the base to the wall without dissembly of the apparatus. A further object provides a bulkhead with sufficient structural integrety to withstand load shifting while either extended or retracted without relying on the flow structure or other peripheral trailer members for support.

Finally, the apparatus may be easily collapsed by one person. This is accomplished by lifting up on the individual extending support members, or attached partition, and locking in place with a friction latch in its upwardly retracted position. This requires no rotating or threaded fasteners or removable hardware that may be lost or misplaced.

These and other objects and advantages of the present invention will become apparent from the subsequent detailed description of the preferred embodiment and the appended claims taken in conjunction with the accompanying drawings.

DESCRIPTION OF THE PREFERRED EMBODIMENT

Figure 7:
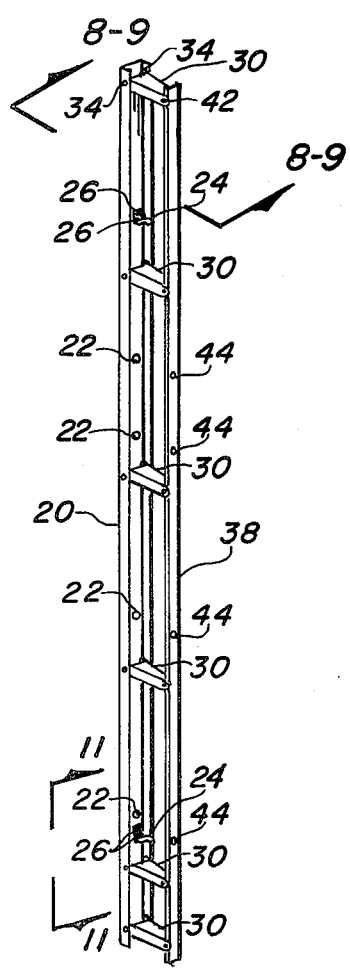
FIG. 7 is a partial isometric view of the preferred embodiment remote from the trailer.
Figure 11:
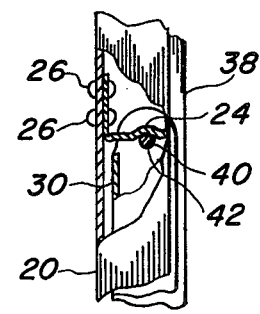
FIG. 11 is a view taken along lines 11—11 of FIG. 7 with a cutout showing the retaining means.

Referring now in detail to the drawings and describing the preferred embodiment, the invention consists of a plurality of channel shaped attaching bases 20 having a length less than the inside height of a refrigerated trailer. The web of the base 20 further contains bores 22, best depicted in FIG. 7, used for attachment to the trailer wall with self-tapping screws, drive rivets or the like. A plurality of spring retaining clips 24, preferably two or more, are attached to the inner web of the base 20, as illustrated in FIGS. 7 and 11. This clip 24 is fabricated of a flexible material with a memory such as spring steel or stainless steel. The clip 24 is angle shaped with one end radiused and the flat portion indented to receive and retain a round member. This clip 24 is fastened to the base 20 with threaded fasteners, self-tapping devices, welding or the like with riveting being preferred utilizing at least a pair of rivets 26.

Each of the legs of the base 20 contain a series of aligned bores 28 to receive a swiveling attaching arm. These bores 28 are equidistant, except a closer spacing is utilized near the bottom for added strength at the maximum load dispersing area.

The base 20 may be fabricated of any material having the structural integrety to withstand shock loads coincident with trailer loading and over-the-road operation. Steel, structural plastic including fiberglass, or magnesium may be utilized with aluminum being preferred. This material may be extruded, however, forming from flat stock is preferable, as this allows the holes to be punched in the flat, which is a more economical method of production.

The bores 28 are aligned with a plurality of toggle arms 30 that are channel shaped with legs that are extended and radiused. Each of the four legs contain a hole 32 to match the above bores 28.

Figure 2:
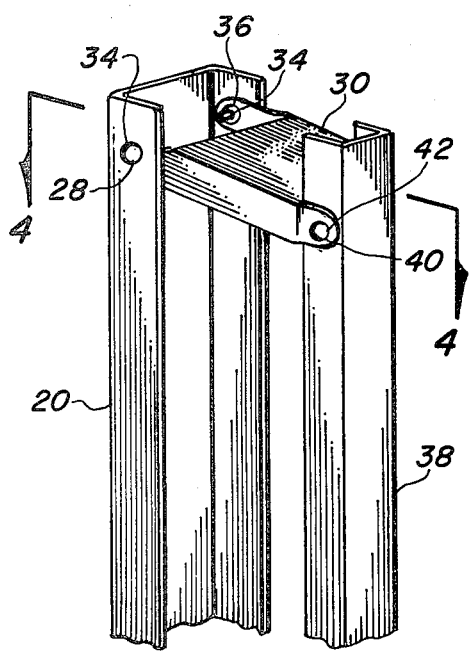
FIG. 2 is a partial isometric view of the invention illustrated in the extended position.
Figure 3:
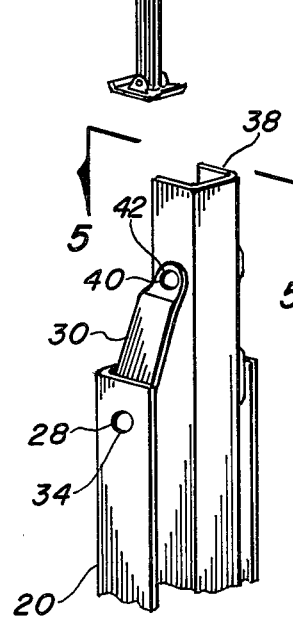
FIG. 3 is a partial isometric view of the invention depicted in the collapsed condition.
Figure 8:
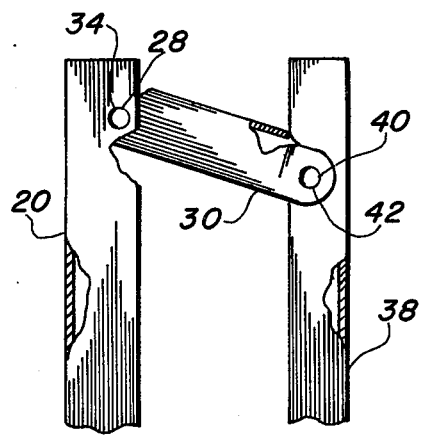
FIG. 8 is a view taken along lines 8—8 of FIG. 7 in the extended position.
Figure 9:
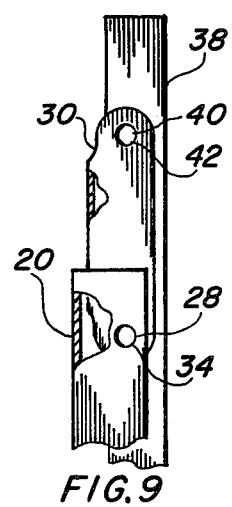
FIG. 9 is a view taken along lines 9—9 of FIG. 7 in the collapsed position.
Figure 10:
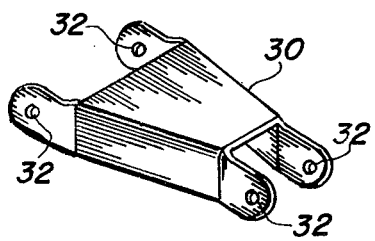
FIG. 10 is a partial isometric view of a toggle arm removed from the assembly.

The toggle arm is best illustrated in FIG. 10 separated from the assembly for clarity, and shown extended in FIGS. 2 and 8 and collapsed in FIGS. 3 and 9. This arm 30 is wider at the end coupled to the base, however, the channel shape is maintained. The legs on the wide end are sized to slip inside the base 20 and rotate freely when attached together through the bore 28 and hole 32. This attachment is accomplished by a rivet 34 held in place with a push-on keeper 36, however, any suitable fastener may be used such as a cotter pin with a key or screws, nuts and washers. The extended legs of the toggle arm 30 allow rotation completely inside of the channel shaped base 20 with no interference by the web of the arm nesting unobstructively together.

Figure 4:
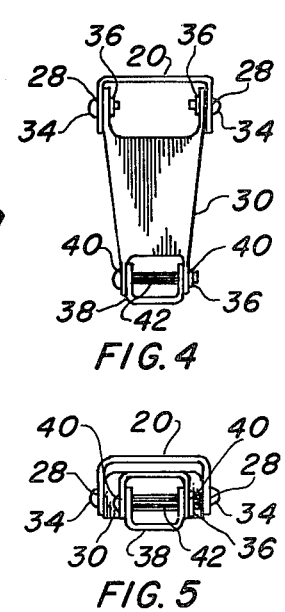
FIG. 4 is a top view taken along lines 4—4 of FIG. 2 showing the invention extended.
Figure 5:
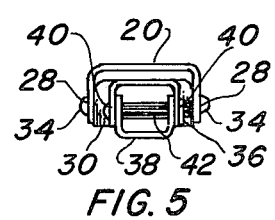
FIG. 5 is a top view taken along lines 5—5 of FIG. 3 showing the invention collapsed.

The other end of the arm 30 is similarly attached to an extending support member 38. This member 38 is also in channel shape but is attached reversely with the web opposite that of the base 20. This member 38 is best depicted extended in FIGS. 2 and 8 and collapsed in FIGS. 3 and 9 with an end view of FIGS. 4 and 5.

The extending support member 38 is the same approximate length as the base 20 with a plurality of bores 40 in spaced relationship to those of the base 20. These bores 40 are located in each leg and mate with the holes 32 of the toggle arms 30. The extended legs of the arm 30 are positioned on the outside of the support member 38 with the bore 40 aligned with the hole 32 and secured with attaching means. This attachment is accomplished preferably with a bearing pin in the form of a rivet 42 extending through both sides of the arm 30 and member 38 being held in place with a push-on keeper 36 the same as used on the opposite end. This fastening arrangement may incorporate the use of dowels with cotter pins in each end or shoulder bolts and nuts or any other suitable method providing a continuity is maintained between the two sides of the arm 30 and member 38.

The rotatable attachment of both ends allows the arm 30 to swivel within the confines of the base 20 and member 38, moving the member 38 away from the base 20 in parallelogram fashion to the extended position and then rotate inwardly to the collapsed condition. This allows the toggle arm 30 to be completely retained within the base 20 and the member 38. This allows the entire assembly to collapse to perhaps one quarter of its extended depth.

The web of the toggle arm 30 embraces the legs of the support member 38 in its extended position holding the apparatus open or extended by the force of gravity. The arrangement of the toggle 30 in relationship to the base 20 and member 38 is over the center of gravity and when extended is positioned by the physical interference of the members. When rotated upwards, nesting of the two open channels takes place reducing the thickness of the device. When unrestrained, the channels separate and seek their angle of repose which is below the horizontal centerline. The extended apparatus has the strength to withstand a horizontal linear force such as inflicted by a shifting load of cargo or horizontal G-loads due to trailer deceleration or downhill operation.

A plurality of toggle arms 30 are utilized in the preferred embodiment with at least two required for operation. Six arms have proven optimum for test loadings of 26,400 lbs. (11,974 kilograms) or 0.4 G's at a theoretical load of 66,000 lbs. (29,937 kilograms). The limiting factor has been the bearing pin 42 which yielded at a load of 30,000 lbs. (13,608 kilograms) with five assemblies attached together.

The web of the extending support members 38 further contain a plurality of clearance holes 44 in spaced relationship with the openings 22 in the base 20. These holes 44 and openings 22 are juxtapositioned when the assembly is collapsed allowing fasteners and tools to be inserted into the holes 44 and secure the assembly to the trailer wall with the forementioned attachments.

When the assembly is collapsed, the shank of the bearing pin 42 is urgingly embraced by the spring retaining clip 24 and is held in place by friction. The radiused end of the clip 24 moves upwardly when forced by the pin 42 from its relaxed position and the indented surface, having a corresponding shape, securely holds the pin in place. When a force is applied in the opposite direction, the pin is released and the assembly is extended by gravity to its normal open position.

Figure 6:
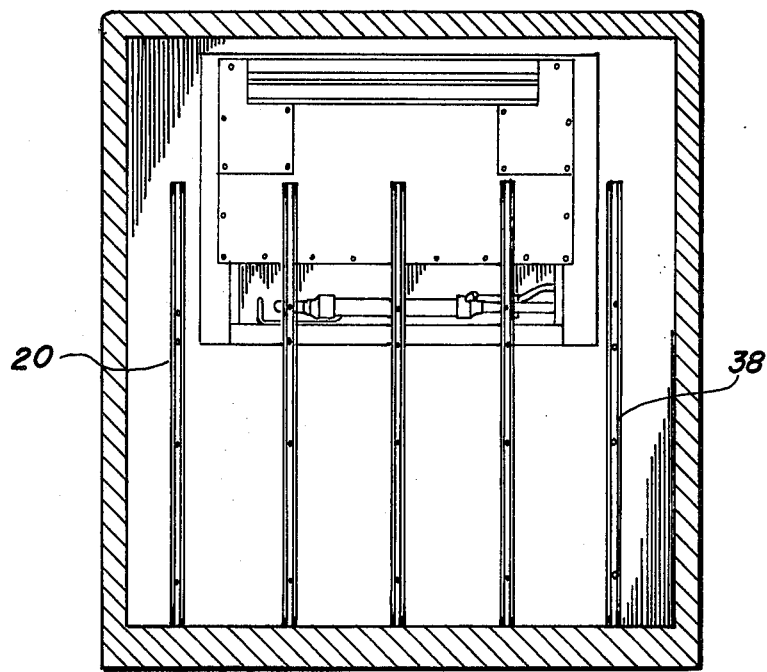
FIG. 6 is a view taken along lines 6—6 of FIG. 1 showing the bulkhead without the partition.

The bulkhead assemblies may be used individually, as shown in FIG. 6, in multiples of at least two, and as many as required to be smaller than the cargo outline and still accomplish the air flow duct utility. The preferred number is five, allowing two pallets to be loaded side-by-side and not block the air flow path.

Figure 1:
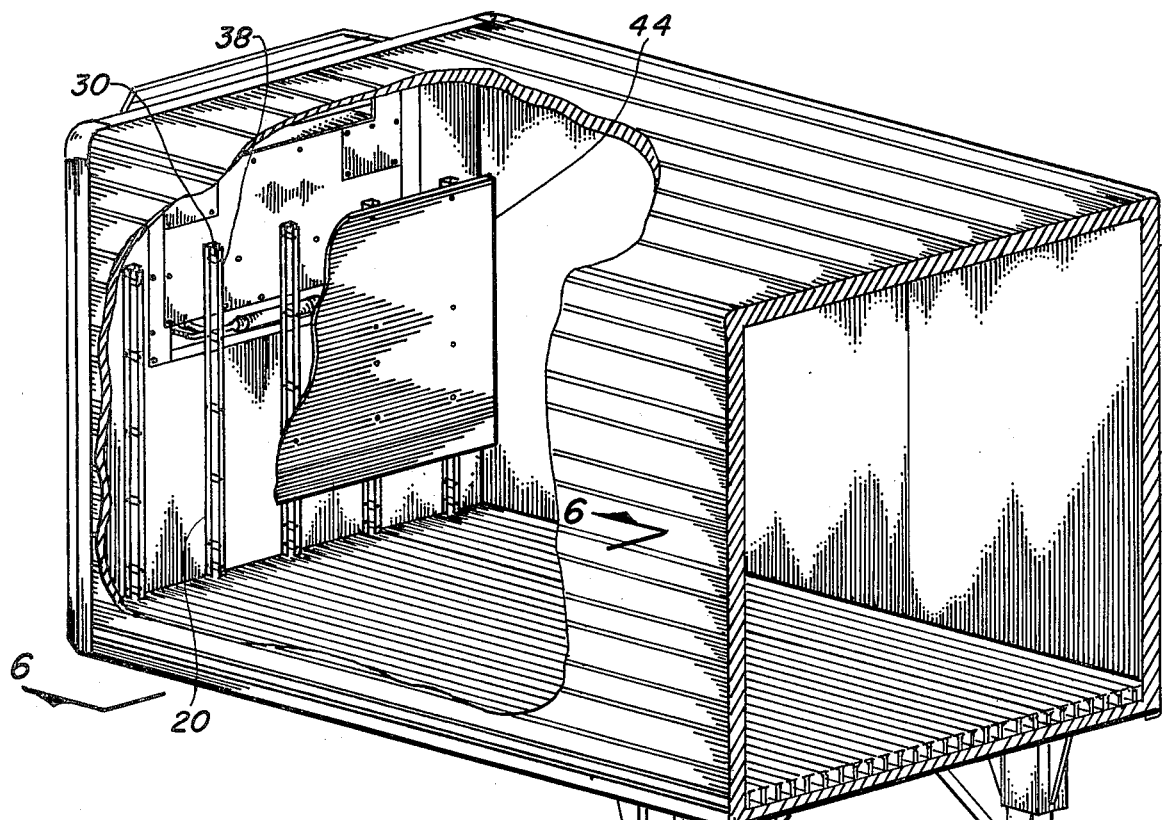
FIG. 1 is a partial isometric view of the preferred embodiment with a cut-away showing the bulkhead attached to the front wall and the rear of the trailer omitted for clarity.

A partition 44, shown in FIG. 1, is secured to the bulkhead assemblies in another embodiment. This partition 44 is narrower than the trailer interior allowing it to move radially with the toggle arms 30.

The bulkhead is normally fabricated of plywood but may be composition wood, thermoplastic, fiberglass or metal, or any suitable substance. The partition 44 is attached to the extended support members 38 by blind fasteners such as drive or blind rivets, self-tapping screws, insert nuts or the like.

The partition 44 is located above the floor line at least two thickness of the bulkhead, allowing unrestricted evaporator return air.

The top of the bulkhead is below the outlet of a refrigeration unit supply air opening, and in the case of a flush evaporator refrigeration unit it completely covers the return air opening. The depth of the bulkhead may vary, however, laboratory tests have indicated that using a 3.80 inch (96.52 millimeter) distance from the trailer wall to the interior of the partition 44 allows an air flow rate of 3300 cubic feet per minute (93.42 cubic meters per minute) to be achieved with a conventional refrigeration unit operating at high speed. This air flow rate is optimum for units in trailers 28 feet (8.46 meters) and above. The velocities through the bulkhead at this air flow rate are approximately 1544 feet per minute (470.6 meters per minute). When the bulkhead is collapsed the air flow rate is reduced to approximately 2475 cubic feet per minute (70.07 cubic meters per minute), which is adequate for unit operation in most normal load and ambient temperature conditions.

When the bulkhead is extended, the support members 38 do not touch the floor but transmit the load directly to the trailer wall through the toggle arms 30. This allows the load bearing surface of the front wall to evenly absorb the shock load of the bulkhead throughout the entire surface, rather than dividing the load horizontally to the wall and vertically to the floor.

Although the invention has been described in complete detail and pictorially shown in the accompanying drawings, it is not to be limited to such details since many changes and modifications may be in the invention without departing from the spirit and scope thereof hence it is described to cover any and all modifications and forms which may come within the language and scope of the appended claims.

We claim:

1. A collapsible bulkhead adapted for mounting on the front interior wall of a refrigerated truck or trailer comprising:
    (a) an attaching base having a backside adapted to be affixed to said trailer interior wall for structural support;
    (b) a plurality of toggle arms having the first end rotatably mounted, with fastening means, to said attaching base and pivotally nested therein;
    (c) an extending support member of a size to be contained within said attaching base having fastening means to pivotally engage a second end of said toggle arm for radially extending or retracting from said trailer wall in parallelogram fashion reducing or increasing the overall width of the bulkhead;
    (d) means to retain said extending support members when pivotally nested into said attaching bases providing retention of the bulkhead in a collapsed condition; and
    (e) said toggle arm comprising a converging channel shaped member having outboard extended legs, having portions defining a hole, nesting and attaching inside of said base on one end and on the other end juxtapositioned on the outside of said support member with the web contiguously engaging the support member limiting the perpendicular rotation.

2. A collapsible bulkhead for mounting on the front interior wall of a refrigerated truck or trailer comprising:
    (a) an attaching base having a backside adapted to be affixed to said trailer interior wall for structural support said attaching base having bores provided therein to facilitate engagement of the base with the trailer interior wall;
    (b) a plurality of toggle arms having the first end rotatably mounted, with fastening means, to said attaching base and pivotally nested therein;
    (c) an extending support member of a size to be contained within said attaching base having fastening means to pivotally engage a second end of said toggle arm for radially extending or retracting from said trailer wall in parallelogram fashion reducing or increasing the overall width of the bulkhead;
    (d) means to retain said extending support members when pivotally nested into said attaching bases providing retention of the bulkhead in a collapsed condition; and
    (e) said support member further comprising a channel shaped form having a plurality of clearance holes in the web aligned with said attaching base bores providing clearance for tools to apply said fastening means to said trailer wall.

3. A collapsible bulkhead adapted for mounting on the front interior wall of a refrigerated truck or trailer comprising:
    (a) an attaching base having a backside adapted to be affixed to said trailer interior wall for structural support;
    (b) a plurality of toggle arms having the first end rotatably mounted, with fastening means, to said attaching base and pivotally nested therein;
    (c) an extending support member of a size to be contained within said attaching base having fastening means to pivotally engage a second end of said toggle arm for radially extending or retracting from said trailer wall in parallelogram fashion reducing or increasing the overall width of the bulkhead;
    (d) means to retain said extending support members when pivotally nested into said attaching bases providing retention of the bulkhead in a collapsed condition; and (e) said means to retain the extending support members further comprising a spring retaining clip affixed to said attaching base for detachably engaging said toggle arm holding the bulkhead in collapsed position by spring tension.

4. A collapsible bulkhead adapted for mounting on an interior wall of a cargo space to form an air duct therewith, comprising:

(a) an attaching base having a web adapted to be affixed to an interior wall of a cargo space for structural support and having a leg extending away from said web;

(b) a plurality of parallelly extending toggle arms having the first end rotatably mounted, with fastening means to a leg of said attaching base and pivotally nested therewith;

(c) a support member having a web portion and a leg portion extending away from said web portion toward the web portion of said attaching base, and having fastening means pivotally engaged with a second end of said toggle arm for extending said support member in parallelogram fashion away from said attaching base to form an air duct when the support member is moved downwardly relative thereto, and for retracting said support member toward said attaching base when the support member is moved upwardly relative thereto;

(d) said support member having a size and shape and being positioned relative to said attaching base so as to nest the leg portion of said support member with the leg portion of said attaching base when moved into the upward position relative thereto; and (e) means to retain said support member in an upward position relative to said attaching base when pivotally nested with said attaching base, thereby providing retention of the bulkhead in a collapsed condition.

5. The bulkhead in accordance with claim 4 wherein said means to retain the extending support members further comprises a spring retaining clip affixed to said attaching base for detachably engaging said toggle arm holding the bulkhead in collapsed position by spring tension.

* * * * *